(12) United States Patent
Edwards et al.

(10) Patent No.: US 12,314,957 B2
(45) Date of Patent: *May 27, 2025

(54) ELECTRONIC PROFILE AND DATA SECURITY ENFORCEMENT WITH USER DEVICE DATA AND METHODS OF USE THEREOF

(71) Applicant: Capital One Services, LLC, McLean, VA (US)

(72) Inventors: Joshua Edwards, Philadelphia, PA (US); Michael Mossoba, Great Falls, VA (US); Abdelkader M'hamed Benkreira, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/601,608

(22) Filed: Mar. 11, 2024

(65) Prior Publication Data
US 2024/0211954 A1 Jun. 27, 2024

Related U.S. Application Data

(63) Continuation of application No. 17/343,263, filed on Jun. 9, 2021, now Pat. No. 11,928,684.

(51) Int. Cl.
*G06Q 30/00* (2023.01)
*G06Q 20/20* (2012.01)
(Continued)

(52) U.S. Cl.
CPC ......... *G06Q 20/4016* (2013.01); *G06Q 20/20* (2013.01); *G06Q 20/382* (2013.01); *G06Q 20/4015* (2020.05)

(58) Field of Classification Search
CPC .. G06Q 20/4016; G06Q 20/20; G06Q 20/382; G06Q 20/4015
See application file for complete search history.

(56) References Cited

U.S. PATENT DOCUMENTS 8,635,157 B2   1/2014   Smith et al.
9,553,838 B1   1/2017   Panchenko et al.
(Continued)

OTHER PUBLICATIONS

T. Ryutov, C. Neuman, K. Dongho and Z. Li, "Integrated access control and intrusion detection for Web servers," in IEEE Transactions on Parallel and Distributed Systems, vol. 14, No. 9, pp. 841-850, Sep. 2003, doi: 10.1109/TPDS.2003.1233707. (Year: 2003).*

(Continued)

*Primary Examiner* — Sun M Li
(74) *Attorney, Agent, or Firm* — Greenberg Traurig, LLP

(57) ABSTRACT

Systems and methods of the present disclosure include computer systems for improving data security. To do so, an authorization request associated with a user profile is received, including a time-stamp for a profile activity, a profile identifier, and a value. Application analytics data for a software application on a user device associated with the user profile is accessed, including an open event indicator indicating a time of a loading, and a close event indicator indicating a time of a termination. An open period of the software application at the time-stamp is determined based on the application open event indicator and the application close event indicator. A reduced set of fraud checks is selected and executed when the time-stamp associated with the profile activity is within the open period of the software application. A fraud determination is generated, and an authorization notification is generated based on the fraud determination.

20 Claims, 7 Drawing Sheets

(51) Int. Cl.
*G06Q 20/38* (2012.01)
*G06Q 20/40* (2012.01)

(56) References Cited

U.S. PATENT DOCUMENTS

| | | | |
|---|---|---|---|
| 9,916,608 | B1 | 3/2018 | Ramalingam et al. |
| 9,971,992 | B2* | 5/2018 | Boding ............... G06Q 10/10 |
| 10,063,579 | B1* | 8/2018 | Machani ............. H04L 67/535 |
| 10,282,724 | B2 | 5/2019 | Hammad |
| 10,565,589 | B2* | 2/2020 | Pitz ..................... H04W 64/00 |
| 2004/0252638 | A1 | 12/2004 | Gonzalez et al. |
| 2017/0357971 | A1* | 12/2017 | Pitz ..................... H04W 4/021 |
| 2017/0357977 | A1* | 12/2017 | Pitz ................... G06Q 20/4016 |
| 2018/0032997 | A1 | 2/2018 | Gordon et al. |
| 2018/0082304 | A1 | 3/2018 | Summerlin et al. |
| 2018/0165682 | A9* | 6/2018 | John ..................... G06F 21/606 |
| 2018/0268408 | A1* | 9/2018 | Botros ................. G06Q 20/405 |
| 2019/0188720 | A1* | 6/2019 | Williams ........... G06Q 20/4016 |
| 2021/0019736 | A1* | 1/2021 | Umrao ................. G06Q 20/208 |
| 2021/0136063 | A1* | 5/2021 | Cheek ................... H04W 12/12 |

OTHER PUBLICATIONS

T. Ryutov, C. Neuman and D. Kim, "Dynamic authorization and intrusion response in distributed systems," Proceedings DARPA Information Survivability Conference and Exposition, Washington, DC, USA, 2003, pp. 50-61 vol. 1, doi: 10.1109/DISCEX.2003.1194872. (Year: 2003).*

P. Ramasubramanian and A. Kannan, "An active rule based approach to database security in e-commerce systems using temporal constraints," TENCON 2003. Conference on Convergent Technologies for Asia-Pacific Region, Bangalore, India, 2003, pp. 1148-1152 vol. 3, doi: 10.1109/TENCON.2003.1273427. (Year: 2003).*

T. Ryutov, C. Neuman and D. Kim, "Dynamic authorization and intrusion response in distributed systems," Proceedings DARPA Information Survivability Conference and Exposition, Washington, DC, USA, 2003, pp. 50-61 vol. 1, doi: 10.1109/DISCEX.2003.1194872. (Year: 2003) (Year: 2003).*

T. Ryutov at al., "Dynamic authorization and intrusion response in distributed systems," Proceedings DARPA Information Survivability Conference and Exposition, Washington, DC, USA, 2003, pp. 50-61 vol. 1, doi: 10.1109/DISCEX .2003.1194872. (Year: 2003).

T. Ryutov et al., "Integrated access control and intrusion detection for Web servers," in IEEE Transactions on Parallel and Distributed Systems, vol. 14, No. 9, pp. 841-850, Sep. 2003, doi: 10.1109/TPDS.2003.1233707 (Year : 2003).

B. Shebaro et al., "Context-Based Access Control Systems for Mobile Devices," in IEEE Transactions on Dependable and Secure Computing, vol. 12, No. 2, pp. 150-163, Mar. 1-Apr. 2015, doi: 10.1109/TDSC.2014.2320731. (Year: 2014).

* cited by examiner

ELECTRONIC PROFILE AND DATA SECURITY ENFORCEMENT WITH USER DEVICE DATA AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to computer-based systems configured for electronic profile and data security enforcement with user device analytics and methods thereof.

BACKGROUND OF TECHNOLOGY

Various actions relative to a user's electronic profile may effect important user data. As a result, data entries relative to these actions, such as, e.g., activity authorization requests and profile data access requests, may be subject to security and fraud checks. However, such checks typically lack a mechanism for user participation and the security and fraud check processes. Therefore, systems and methods typically rely on inference and cannot employ any user feedback.

SUMMARY OF DESCRIBED SUBJECT MATTER

In some embodiments, the present disclosure provides an exemplary technically improved computer-based method that includes at least the following steps of receiving, by at least one processor, an profile activity authorization request associated with a user profile, where the profile activity authorization request includes: i) a time-stamp associated with an profile activity, ii) an profile identifier identifying the user profile associated with the profile activity, and iii) a value associated with the profile activity; accessing, by the at least one processor, application data for a software application being run on a user device associated with the user profile, where the application data includes: i) an application open event indicator indicating a time of a loading of the software application on a user device, and ii) an application close event indicator indicating a time of a terminating of the software application on the user device; determining, by the at least one processor, an open period of the software application on the user device at the time-stamp associated with the profile activity based on the application open event indicator and the application close event indicator; selecting, by the at least one processor, a reduced set of fraud checks within a full set of fraud checks when the time-stamp associated with the profile activity is within the open period of the software application; executing, by the at least one processor, the reduced set of fraud checks; generating, by the at least one processor, a fraud determination based on the execution of the reduced set of fraud checks; and generating, by the at least one processor, an authorization notification for the profile activity authorization request based on the fraud determination.

In some embodiments, the present disclosure provides an exemplary technically improved computer-based system that includes at least the following components of at least one processor. The at least one processor is configured to execute software instructions causing the at least one processor to perform steps to: receive an profile activity authorization request associated with a user profile, where the profile activity authorization request includes: i) a time-stamp associated with an profile activity, ii) an profile identifier identifying the user profile associated with the profile activity, and iii) a value associated with the profile activity; access application analytics data for a software application being run on a user device associated with the user profile, where the application analytics data includes: i) an application open event indicator indicating a loading of the software application on a user device, and ii) an application close event indicator indicating a terminating of the software application on the user device; determine an open period of the software application on the user device at the time-stamp associated with the profile activity based on the application open event indicator and the application close event indicator; select a reduced set of fraud checks within a full set of fraud checks where the time-stamp associated with the profile activity is within the open period of the software application; execute the reduced set of fraud checks; generate a fraud determination based on the execution of the reduced set of fraud checks; and generate an authorization notification for the profile activity authorization request based on the fraud determination.

The present disclosure further includes other embodiments of systems and methods further including determining, by the at least one processor, the full set of fraud checks where the time-stamp associated with the profile activity is not within the open period of the software application.

The present disclosure further includes other embodiments of systems and methods further including determining, by the at least one processor, an absence of the application close event indicator; determining, by the at least one processor, a time difference between a current time and the application open event indicator; determining, by the at least one processor, an application crash where the time difference exceeds a predetermined time period; and determining, by the at least one processor, the open period to be the predetermined time period for the application crash.

The present disclosure further includes other embodiments of systems and methods further including determining, by the at least one processor, the open period to be the time difference where the time difference is less than the predetermined time period.

The present disclosure further includes other embodiments of systems and methods further including accessing, by the at least one processor, a device identifier in the application analytics data for the software application associated with the user profile; determining, by the at least one processor, an authorization of the device identifier in the user profile; and generating, by the at least one processor, the fraud determination based on the reduced set of fraud checks and the device identifier.

The present disclosure further includes other embodiments of systems and methods further including receiving, by the at least one processor, a location associated with the profile activity authorization request; accessing, by the at least one processor, a device location in the application analytics data for the software application associated with the user profile; determining, by the at least one processor, a proximity of the user device to the location based on the device location; and generating, by the at least one processor, the fraud determination based on the reduced set of fraud checks and the proximity.

The present disclosure further includes other embodiments of systems and methods further including where the proximity replaces a subset of fraud checks in the reduced set of fraud checks.

The present disclosure further includes other embodiments of systems and methods further including where the user profile includes a profile at a financial institution, and the profile activity authorization request includes a payment request issued by a point-of-sale terminal at a merchant location.

The present disclosure further includes other embodiments of systems and methods further including where the software application includes a banking application associated with an issuer of a payment card associated with the payment request.

The present disclosure further includes other embodiments of systems and methods further including where the reduced set of fraud checks includes reduced fraud thresholds for each fraud check in a full set of fraud checks.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" May be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 7 illustrate systems and methods of securing profiles and user data using user device analytics data. The following embodiments provide technical solutions and technical improvements that overcome technical problems, drawbacks and/or deficiencies in the technical fields involving imprecise security and fraud testing of user's profiles and profile-related electronic activities. As explained in more detail, below, technical solutions and technical improvements herein include aspects of improved user participation in real-time security determinations regarding user profile-related electronic activities. Based on such technical features, further technical benefits become available to users and operators of these systems and methods. Moreover, various practical applications of the disclosed technology are also described, which provide further practical benefits to users and operators that are also new and useful improvements in the art.

Figure 1:
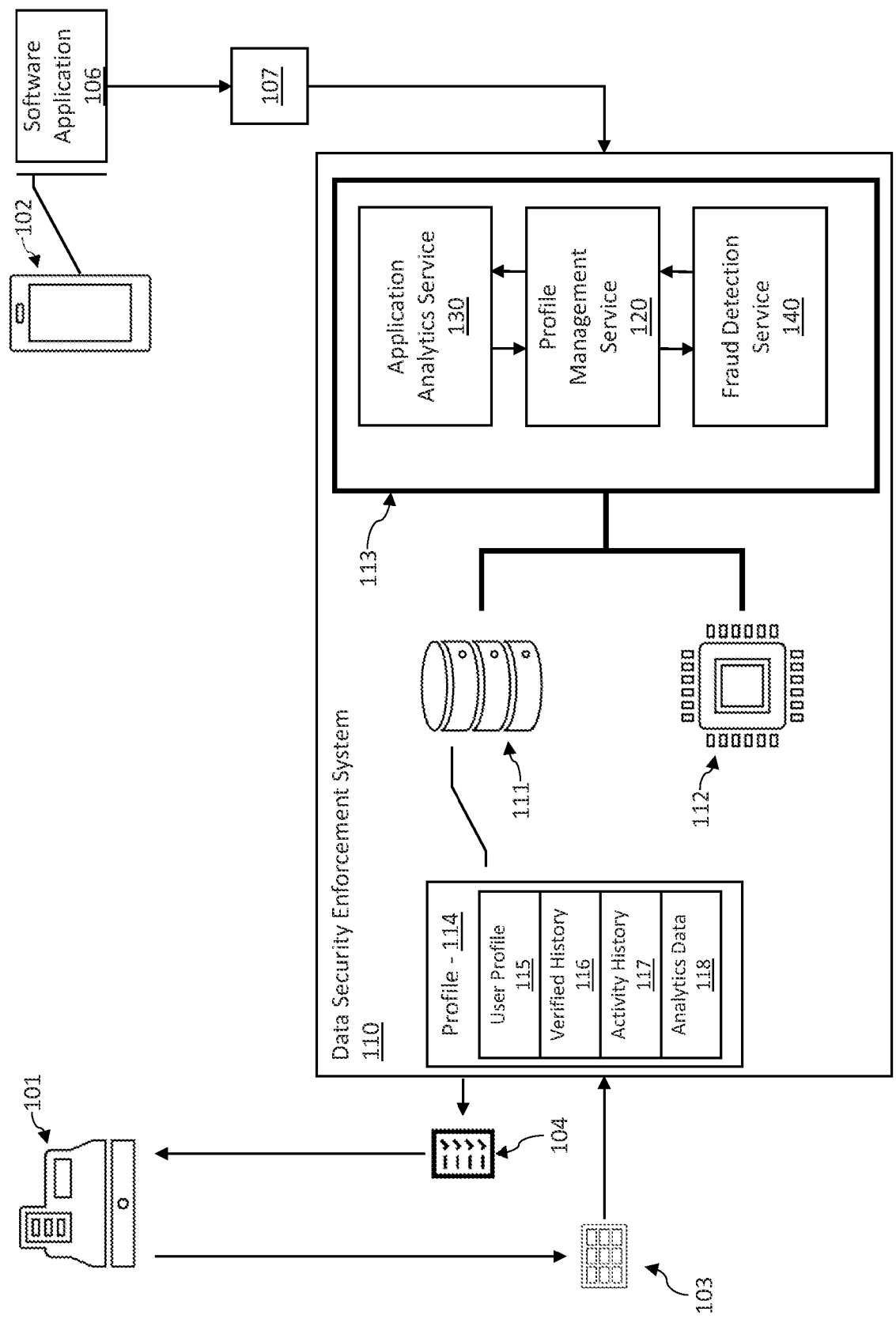
FIGS. 1-7 show one or more schematic flow diagrams, certain computer-based architectures, and/or screenshots of various specialized graphical user interfaces which are illustrative of some exemplary aspects of at least some embodiments of the present disclosure.

FIG. 1 is a block diagram of another exemplary computer-based system for profile and data security enforcement with user participation in accordance with one or more embodiments of the present disclosure.

In some embodiments, a data security enforcement system 110 leverages application analytics data 107 from a software application of a user computing device 102 for data security and enforcement of profile activity authorization requests 103 issued for the user's profile 114. In some embodiments, the data security enforcement system 110 analyzes the profile activity authorization requests 103 using security services 113 informed by the application analytics data 107 to perform security and fraud checks. As a result, the data security enforcement system 110 may authorize or decline an electronic profile activity associated with the profile activity authorization request 103 based, in part, on the application analytics data 107. Therefore, the user provides real-time participation in the data security and enforcement related to the user's profile 114 via the application analytics data 107.

In some embodiments, an electronic profile activity execution system 101 may be configured to execute electronic activities for the user. For example, in some embodiments, the electronic profile activity execution system 101 may include any computing device from electronic activities are performed or executed, such as, e.g., a terminal, personal computer or mobile computing device for performing Internet-based and application-based activities (e.g., profile log-ins, profile information changes, online purchases, instant message communications, social media posts, among others and combinations thereof).

In some embodiments, the electronic profile activity execution system 101 may include a physical terminal for performing electronic transactions, such as, e.g., a point-of-sale device, automated teller machine (ATM) or other device. As a result of a user executing electronic activities via the electronic profile activity execution system 101, data entries may be produced for entry into the user's profile. For example, the electronic profile activity execution system 101 may produce an profile activity authorization request 103.

In some embodiments, the profile activity authorization request 103 may include, e.g., a user identifier associated with each data entry, a third-party entity identifier associated with each data entry, an activity type identifier, an activity value or activity quantity, a time data item, a location data item, a date data item, a device type or device identifier associated with the electronic profile activity execution system 101, an activity description, or other attributes representing characteristics of each data entry.

For example, in some embodiments, the profile activity authorization request 103 may include a transaction-related activity, such as a transaction record (e.g., transaction authorization request, posted transaction, etc.). In such an example, the data items may include, e.g., a transaction value, a transaction type, an profile identifier or a user identifier or both, a merchant identifier, a transaction authorization date, a transaction post date, a transaction location, an execution device (e.g., point-of-sale device, Internet payment, etc.) among other transaction data and combinations thereof.

In some embodiments, the data security enforcement system 110 may receive the profile activity authorization request 103 to authorize or deny an associated profile-related electronic profile activity. In some embodiments, the data security enforcement system 110 may be a part of the user computing device 102. Thus, the data security enforcement system 110 may include hardware and software components including, e.g., user computing device 102 hardware and software, cloud or server hardware and software, or a combination thereof.

In some embodiments, the data security enforcement system 110 may include hardware components such as a processor 111, which may include local or remote processing components. In some embodiments, the processor 111 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 111 may include data-processing capacity provided by the microprocessor. In some embodiments, the microprocessor may include memory, processing, interface resources, controllers, and counters. In some embodiments, the microprocessor may also include one or more programs stored in memory.

Similarly, the data security enforcement system 110 may include storage 112, such as local hard-drive, solid-state drive, flash drive, database or other local storage, or remote storage such as a server, mainframe, database or cloud provided storage solution.

In some embodiments, the data security enforcement system 110 may implement computer engines for the security services 113. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the security services 113 may include locally instantiated computer engines that are local to the data security enforcement system 110. In some embodiments, one or more of the security services 113 may include remote services instantiated and implemented by a remote system, such as, e.g., as a cloud service or other suitable software-as-a-service (SaaS) or function-as-a-service (FaaS) implementation. In some embodiments, where the security services 113 are remotely implemented, the data security enforcement system 110 may, e.g., issue application programming interface (API) requests to request the associated software or function provided by each security service 113.

In some embodiments, to facilitate data security enforcement, the security services 113 of the data security enforcement system 110 may include computer engines and/or services including, e.g., an profile management service 120. In some embodiments, the profile management service 120 may manage the profile 114, include entering the application analytics data 107 into an analytics data 118, enter the profile activity authorization request 103 into an activity history 117, enter the profile activity authorization request 103 into a verified history 116 upon authorization, and maintain a user profile 115.

For example, the user profile 115 may include, e.g., a financial profile related to user profile 115. For example, the user profile 115 may include, e.g., a user profile at a financial institution such as bank profile, brokerage profile, etc.

In order to implement the profile management service 120, the profile management service 120 may include one or more computer engines and/or services that may include software components, hardware components, or a combination thereof. For example, each computer engine may include a dedicated processor and storage. However, in some embodiments, the computer engines share hardware resources, including the processor 111 and storage 112 of the data security enforcement system 110 via, e.g., a bus or other communication interface. Thus, the profile management service 120 may include a memory including software and software instructions, such as, e.g. machine learning models and/or logic for managing the profile 114, including authorizing or denying the associated electronic profile activity for entry into the activity history 117 and/or verified history 116.

In some embodiments, in order to make more accurate and efficient determinations regarding data security, such as fraudulent profile activity authorization requests, the profile management service 120 may leverage interoperability with an application analytics service 130 and a fraud detection service 140. Based on the analytics data 118 entered by the application analytics service 130 in response to the application analytics data 107 from the software application 106, the profile management service 120 may determine whether the user uses the software application 106 to authorize the electronic profile activity at the electronic profile activity execution system 101. Based on the application analytics data 107 and other data received and/or determined by the application analytics service 130, the profile management service 120 may call the fraud detection service 140 to perform and return results from fraud checks and other data security checks. Based on the results, the profile management service 120 may manage the profile 114 to either authorize or deny the profile activity authorization request 103.

In some embodiments, the fraud checks may be selected based on whether the user uses the software application 106 at the time of the profile activity authorization request 103. Accordingly, the application analytics service 130 may receive the application analytics data 107 from the software application 106, e.g. directly from the user computing device 102, or by referencing the analytics data 118 logged in the profile 114.

In some embodiments, the application analytics service 130 may include one or more computer engines and/or services that may include software components, hardware components, or a combination thereof. For example, each computer engine may include a dedicated processor and storage. However, in some embodiments, the computer engines share hardware resources, including the processor 111 and storage 112 of the data security enforcement system 110 via, e.g., a bus or other communication interface. Thus, the application analytics service 130 may include a memory including software and software instructions, such as, e.g. machine learning models and/or logic for accessing, analyzing and logging the analytics data 118 for the profile 114 based on the application analytics data 107 from the user computing device 102.

In some embodiments, the profile management service 120 may utilize a set of fraud and security checks of the fraud detection service 140 against the profile activity authorization request 103. In some embodiments, the set of fraud and security checks may depend on the application analytics data 107 from the time of the profile activity authorization request 103. For example, the user may have opted into a program to actively authorize electronic activities by logging in to or access the software application 106 during execution of the electronic profile activity at the electronic profile activity execution system 101 or use the software application 106 according to any other suitable predetermined condition to actively authorize the electronic profile activity. For example, the predetermined condition may include, e.g., a user interaction with a particular interface element or set of interface elements, access the software application 106 in a particular location or proximity to the electronic profile activity execution system 101 or location of the electronic profile activity, enter login credentials, a personal identification number (PIN) or password, or use the software application 106 according to any other suitable predetermined condition.

Where the user performs the predetermined condition with the software application 106 at the time of the electronic profile activity, a reduced set of fraud checks may be employed, compared to a full set of fraud checks that is performed when the user has not opted into the program. However, where the user does not perform the predetermined condition with the software application 106 at the time of the electronic profile activity but has opted into the program, the profile activity authorization request 103 may be immediately denied. In some embodiments, the performance of the predetermined condition may be recorded by the software application 106 in the application analytics data 107 and reported to the data security enforcement system.

Therefore, in some embodiments, based on the application analytics data 107 and/or determinations from the application analytics service 130, the profile management service 120 may interface with the fraud detection service 140 to perform either the full set or the reduced of fraud and security checks, or to deny the profile activity authorization request 103. In some embodiments, the profile management service 120 may immediately deny the profile activity authorization request 103 where the application analytics data 107 indicates that the user did not perform the predetermined condition at the time of the electronic profile activity based on the application analytics service 130. However, in some embodiments, the profile management service 120 may instruct the fraud detection service 140 to use the performance of the predetermined condition as a particular fraud check of the set of fraud checks.

In some embodiments, the fraud detection service 140 may include one or more computer engines and/or services that may include software components, hardware components, or a combination thereof. For example, each computer engine may include a dedicated processor and storage. However, in some embodiments, the computer engines share hardware resources, including the processor 111 and storage 112 of the data security enforcement system 110 via, e.g., a bus or other communication interface. Thus, the fraud detection service 140 may include a memory including software and software instructions, such as, e.g. machine learning models and/or logic for implementing the fraud and security checks against the profile activity authorization request 103.

In some embodiments, the fraud detection service 140 may report the results of the fraud and security checks against the profile activity authorization request 103 to the profile management service 120. In some embodiments, based on the results from the fraud detection service 140, the profile management service 120 may issue a response 104 including an authorization or a denial of the electronic profile activity associated with the profile activity authorization request 103. In some embodiments, the data security enforcement system 110 may return the response 104 to the electronic profile activity execution system 101 to automatically prevent execution of the associated electronic profile activity. As a result, the user may at least partially control or otherwise participate in the authorization or denial of profile activity authorization requests simply by using the software application 106. The use of the application analytics data 107 to determine whether the user used the software application 106 or used the software application 106 in a particular way according to the predetermined condition enables the data security enforcement system 110 to enforce data security for the profile 114 based on user participation that does not require any explicitly communication with the user. Therefore, no electronic messages or other communications requesting user authorization are required to determine the user's intention to participate in the electronic profile activity.

Figure 2:
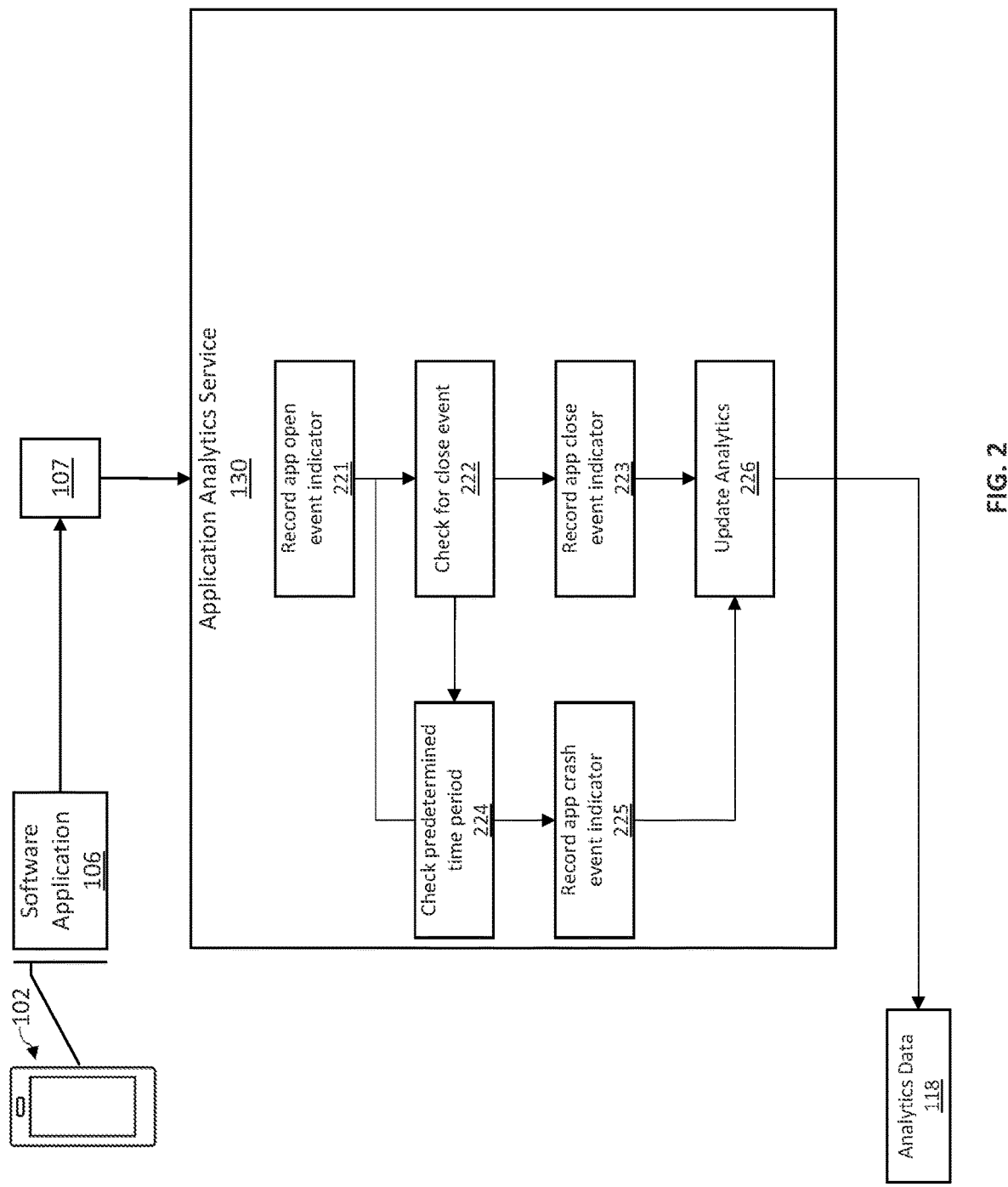

FIG. 2 is a block diagram of an application analytics service of another exemplary computer-based system for profile and data security enforcement with user participation in accordance with one or more embodiments of the present disclosure.

In some embodiments, the application analytics service 130 may receive the application analytics data 107 from the software application 106 on the user computing devices. In some embodiments, the application analytics data 107 may include the tracking of a variety of metrics on the backend, the front-end, or both of the software application 106 stack. For example, such metrics may include, e.g., device type, device identifier, operating system, location, among other device-specific characteristics of the user computing device 102, application performance data including, e.g., bugs, application open events, application close events, crash reports, network communication performance, among other metrics and data associated with the performance of the software application 106. User interaction with the software application 106, including the performance of the application, such as application opening times and application closing times, as well as location of opening and device identifiers, may be logged and sent to the application analytics service 130 to be logged in the user's profile 114 with the analytics data 118.

For example, the software application 106 may include a banking application for the profile 114 associated with financial transactions with respect to a financial account, such as, e.g., electronic payments. For example, where the user executes a transaction with a payment, the issuer of the card may operate the software application 106 to maintain transaction histories in the activity history 117 and application analytics in the analytics data 118. User interaction with the banking application, including the performance of the application, such as application opening times and application closing times, as well as location of opening and device identifiers, may be logged and sent to the application analytics service 130 to be logged in the user's profile 114 with the analytics data 118.

In some embodiments, the application analytics service 130 may receive the application analytics data 107 from the user computing device 102. In some embodiments, the application analytics data 107 may specify, e.g., a device identifier for the user computing device 102 running the software application 106 associated with the user profile. In some embodiments, the device identifier may include, e.g., a hardware identifier, a serial number, or other device identifier. In some embodiments, the application analytics data 107 may also include indicators for application events where user interaction causes the application event to occur. Such indicators may include, e.g., an application open event indicator indicating a time of a loading of the software application 106 on the user computing device 102, a device location for the software application 106 on the user computing device 102, an application close event indicator indicating a time of a closing of the software application 106, among other indicators for application events.

In some embodiments, the application analytics service 130 may also determine application use characteristics from the application analytics data 107. For example, the application analytics service 130 may automatically authorize the device identifier based on, e.g., the user profile 115. In some embodiments, the user profile 115 may include permissioned devices, such as, e.g., mobile devices, laptop computer devices, desktop computer devices, wearable devices, among other suitable user computing devices 102. In some embodiments, the application analytics service 130 may use the device identifier of the application analytics data 107 to reference the user profile 115 in which the device identifier is permissioned. Based on an identification of the user profile 115, the application analytics service 130 may authorize the device identifier and proceed to log analytics in the analytics data 118 of the associated profile 114.

In some embodiments, upon identifying the profile 114, the application analytics service 130 may record, at block 221, an application open event indicator in the analytics data 118. In some embodiments, the application analytics data 107 may include indicators for application events such as the time of loading the software application 106 upon user access on the user computing device 102. Such indicators may be logged in the analytics data 118 for the profile 114 to indicate the time of the loading of the software application 106.

In some embodiments, the application state, such as the software application 106 being loaded on the user computing device 102, at the time of the electronic profile activity may be used as a way for the user to show intentionality for the execution of the electronic profile activity. For example, when executing a transaction, the user may open the banking application for the card being used to execute the transaction. The opening of the banking application may serve as the user's signaling of an authorized transaction. Accordingly, the application analytics service 130 may track the software application 106 open and close events for verification that the user had the software application 106 open at the time of the electronic profile activity.

Accordingly, in some embodiments, in addition to the application open event indicator, the application analytics service 130 may check, at block 222 for an application close event. In some embodiments, the application close event may include the exiting by the user from the software application 106 on the user computing device 102, thus ending processes and functions associated with the software application 106. Where the user exits the software application 106, an application close event indicator specifying the closing of the software application and the time at which the software application 106 was closed may be appended to the application analytics data 107 to signal the closing of the software application 106.

In some embodiments, where an application close event indicator is found, the application analytics service 130 may record the application close event indicator, e.g., by logging the application close event indicator in the profile 114. Accordingly, the analytics data 118 may log each application open event indicator and each application close event indicator. As a result, the application analytics service 130 may determine, e.g., an open period during which the software application 106 was open on the user computing device 102. However, in some embodiments, the application analytics service 130 may log the application close event indicator without determining the open period.

In some embodiments, where the application close event indicator is not found in the application analytics data 107, the application analytics service 130 may check, at block 224, whether a predetermined time period has elapsed in the absence of application close event. Based on how much time has passed since the application open event indicator in the absence of application close event indicator, the application analytics service 130 may determine that the software application 106 has either crashed, thus prevent the issuance of the application close event indicator or is still open.

Accordingly, in some embodiments, the application analytics service 130 may determine a current time and determine a time difference between the current time and the time of the application open event indicator. Where the time difference exceeds the predetermined time period, the application analytics service 130 may determine that the software application crashed and record, at block 225, the software application crash event indicator. In some embodiments, because crashes are not directly reported in the application analytics data 107, the application analytics service 130 may determine that the application crash event occurred upon the predetermined time period following the application open event. Accordingly, the application analytics service 130 may record the application crash event indicator to indicate the time of the crash as an application close event indicator at the predetermined time period following the application open event indicator.

In some embodiments, where the predetermined time period has not elapsed, the application analytics service 130 may recheck for the application close event at block 222. In some embodiments, the application analytics service 130 may wait for a delay period before rechecking for the application close event indicator. In some embodiments, the delay period may include, e.g., five seconds, ten seconds, fifteen seconds, twenty seconds, thirty seconds, one minutes, two minutes, three minutes, five minutes, or any multiple thereof.

In some embodiments, the predetermined time period may include any suitable time period greater than the time period expected for the user to keep the software application 106 open. Users typically do not keep the application open beyond a certain time period. After the time period, the user ceases interaction and the application is moved out of memory, or the user actively closes the software application 106. Accordingly, the, e.g., average time, median time, seventieth percentile length of time, eightieth percentile length of time, ninetieth percentile length of time, ninety-fifth percentile length of time, or other statistical degree of the expected length of time for the software application 106 to be open may be used as the predetermined time period. In another example, the predetermined time period may include a period of, e.g., five minutes, ten minutes, fifteen minutes, twenty minutes, thirty minutes, one hour, or more. In some embodiments, the predetermined time period may be a number of iterations rechecking for the application close event indicator. Accordingly, the predetermined time period may include the number of iterations multiplied by the delay period.

In some embodiments, recording the application close event indicator at block 223 and/or the application crash event indicator at block 225 may cause the application analytics service 130 to update the analytics data 118 at block 226. In some embodiments, updating the analytics data 118 may include, e.g., generate a session log with the application open event indicator indicating the opening or accessing the software application 106 for a session, the application close event indicator and/or the application crash event indicator indicating a time of a closing or crashing of the software application 106 ending the session, as well as, e.g., the time difference between the application open event indicator and the application close event indicator and/or the application crash event indicator. In some embodiments, the session log in the analytics data 118 may also be updated with other application analytics data 107 during the session, such as, e.g., user interactions, software application 106 performance, user computing device 102 location, among other analytics data.

Figure 3:
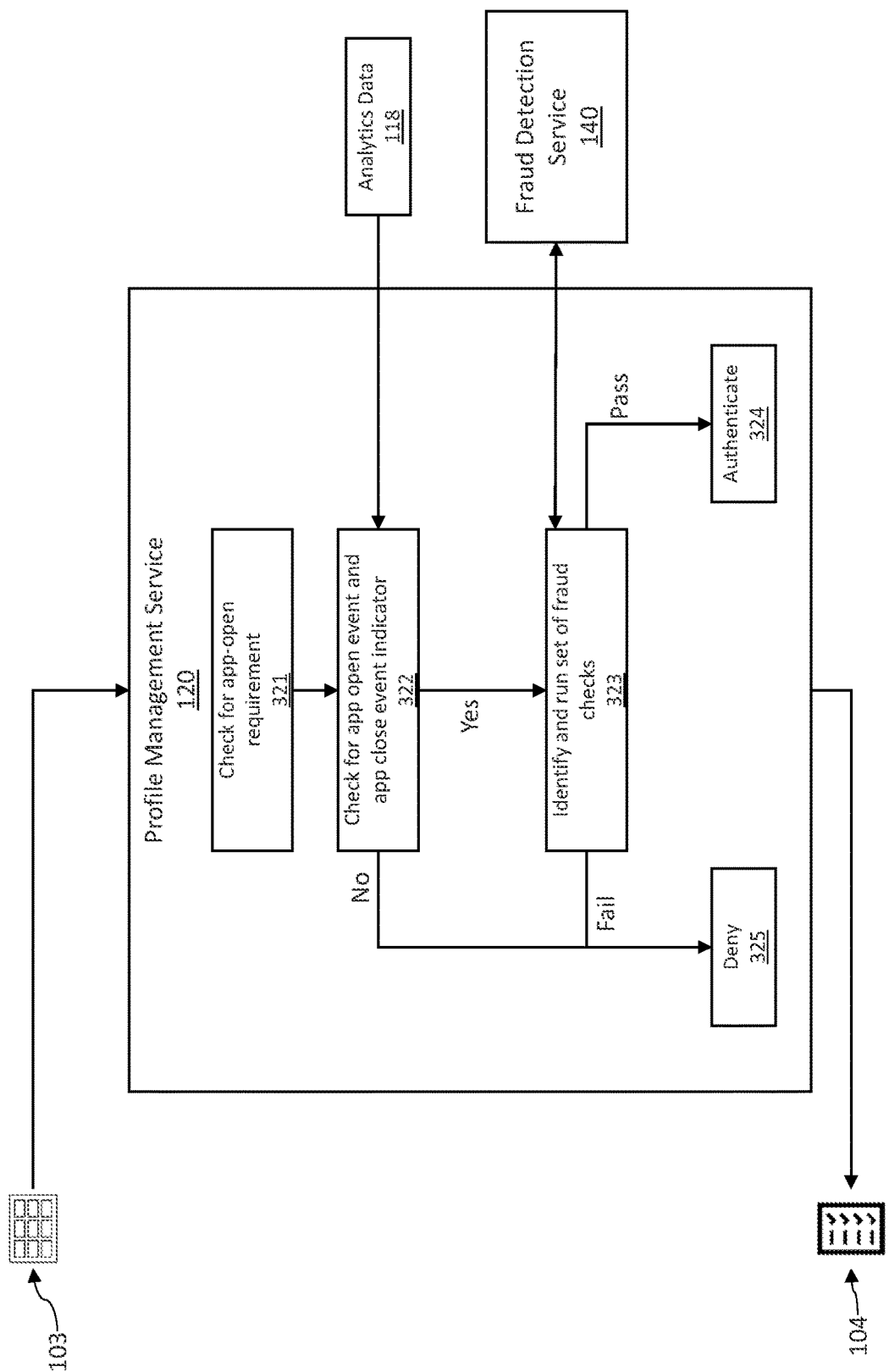

FIG. 3 is a block diagram of an profile management service of another exemplary computer-based system for profile and data security enforcement with user participation in accordance with one or more embodiments of the present disclosure.

In some embodiments, the profile management service 120 may leverage the analytics data 118 logged by the application analytics service 130 and the fraud check of the fraud detection service 140 to authorize profile activity authorization requests 103 based on user behaviors in the software application 106 during the electronic profile activity. For example, the user may indicate that the electronic profile activity is intentional and authorized by interacting with the software application 106 during the execution of the electronic profile activity. For example, where the electronic profile activity includes a transaction, the user may access the banking application associated with the financial profile being used for the transaction. Thus, without needing to explicit select or specify a transaction or other electronic profile activity, the user may validate the transaction or other electronic profile activity by simply opening the software application 106. Other possible electronic activities may include, e.g., logging into an electronic profile (e.g., social media, financial, cloud storage, email, or other online profile) on another device, posting of social media among other electronic activities and combinations thereof, the user may provide another factor of authorization by having the corresponding application open on the user computing device 102.

Accordingly, in some embodiments, the profile management service 120 may receive the profile activity authorization request 103. In some embodiments, the profile activity authorization request 103 may include data related to the electronic profile activity, such as, e.g., a time-stamp indicating a time of the electronic profile activity, an profile identifier identifying the profile 114 associated with the electronic profile activity, a location associated with the electronic profile activity, as well as other suitable data, such as, e.g., a value or quantity associated with the electronic profile activity, an entity identifier identifying an entity associated with the electronic profile activity other than the user, an activity type identifier, an activity operation identifier, electronic profile activity execution system 101 identifier, among other data. For example, for electronic activities include transactions, the profile activity authorization request 103 may include the time, location, dollar value, transaction type, transaction operation, merchant, merchant category code (MCC), point-of-sale device (POS) identifier, among other data.

In some embodiments, the use of analytics data 118 to assist in determining the authorization for the profile activity authorization request 103 may or may not be a default arrangement. In some embodiments, the default arrangement may include authorization via a full set of fraud checks by the fraud detection service 140. Where the default arrangement is to perform the full set of fraud checks, the user may opt in to the use of analytics data 118 to augment the authorization process. Accordingly, in some embodiments, the profile management service 120 may check, at block 321, for an app-open requirement indicating the user's opt in to the augmented authorization process. In some embodiments, the app-open requirement may be in the user profile 115 of the profile 114 based on the user having specified the app-open requirement for electronic activities, e.g., via the software application 106, a web browser, or other method for opting in to the app-open requirement.

In some embodiments, where the app-open requirement is not present, the user has not opted into the app-open requirement form of augmented authorization. Accordingly, where the app-open requirement is not present, the profile management service 120 may instruct the fraud detection service 140 to perform the full set of fraud checks to authorize the profile activity authorization request 103.

However, where the app-open requirement is present in the user profile 115, the profile management service 120 may check, at block 322, for an application open event indicator, application close event indicator, application crash event indicator, and/or open period of the software application 106 in the analytics data 118 based on the logging of the application analytics data 107 by the application analytics service 130. Therefore, in some embodiments, the profile management service 120 checks the analytics data 118 for a session of the software application 106 associated with the electronic profile activity of the profile activity authorization request 103. Where the session matches the time of the profile activity authorization request 103, the software application 106 may be determined to have been open during the electronic profile activity.

In some embodiments, the software application 106 may be determined to have been open during the electronic profile activity where the analytics data 118 includes a session with an open period within which the time of the profile activity authorization request 103 occurred. In some embodiments, the analytics data 118 may include the open period of the session, as described above. Thus, the profile management service 120 may utilize the application open event indicator and the open period to determine whether the software application 106 was open. However, where the open period is not specified in the analytics data 118, the profile management service 120 may utilize the application open event indicator and the presence or lack of an application close event indicator and/or application crash event indicator to determine whether the software application 106 was open during the electronic profile activity.

In some embodiments, where an application close event indicator or application crash event indicator is present for the session in the analytics data 118, the profile management service 120 may determine that the software application 106 session ended at the time of the application close event indicator or the application crash event indicator. Thus, the open period may be determined as the time period between the application open event indicator and the application close event indicator or the application crash event indicator. Where the application close event indicator and/or the application crash event indicator is not present, the profile management service 120 may determine the software application 106 to currently be open. Thus, the open period may be determined to be ongoing and beginning at the application open event indicator.

In some embodiments, the app-open requirement may also require the user computing device 102 to be in a location of the electronic profile activity as specified in the profile activity authorization request 103 during the open period while the electronic profile activity is performed. Accordingly, the profile management service 120 may additionally check whether the location of the analytics data 118 for the session coincides with the location of the profile activity authorization request 103. The app-open requirement may be satisfied where the software application 106 is deemed to have been open during the electronic profile activity and/or in the location of the electronic profile activity, such as during a purchase at the location of the point-of-sale device.

In some embodiments, where the application open event does not exist, the profile management service 120 may determine that the software application 106 was not open at the time of the electronic profile activity. Accordingly, the profile management service 120 may deny, at block 325, the profile activity authorization request 103. However, in some embodiments, the software application 106 not being open during the electronic profile activity may instead or in addition instruct the fraud detection service 140 to perform additional fraud checks in addition to the full set of fraud checks. In some embodiments, where location is required as well, the profile management service 120 may deny the profile activity authorization request 103 where the location of the application analytics data 107 of the software application 106 differs from the location of the profile activity authorization request 103.

In some embodiments, the location may be determined to coincide or to differ from the location of the profile activity authorization request 103 based on a proximity of the location of the software application 106 to the location of profile activity authorization request 103. Accordingly, the profile management service 120 may determine the proximity as the difference between the location of the software application 106 and the location of profile activity authorization request 103. Where the proximity is within a predetermined distance, such as, e.g., ten feet to fifteen feet, fifteen to twenty feet, twenty to thirty feet, thirty to fifty feet, fifty to one hundred feet, or other suitable proximity, the profile management service 120 may determine the location of the software application 106 to coincide with the location of profile activity authorization request 103.

In some embodiments, where the application open event exists such that the open period coincides with the electronic profile activity, the profile management service 120 may utilize the fraud detection service 140 to identify and run a set of fraud checks at block 323. In some embodiments, opting in to the app-open requirement may include a reduced set of fraud checks when authorizing profile activity authorization requests, effectively replacing a subset of the fraud checks with the open period and proximity checking. As a result, the efficiency of profile security is improved by performing fewer computationally intensive fraud checks. However, in some embodiments, the app-open requirement may be used to enhance profile security by adding the app-open requirement to the full set of fraud checks. In some embodiments, upon opt-in, the user may specify in the user profile 115 whether to enhance security or enhance efficiency with the app-open requirement.

In some embodiments, depending on whether the app-open requirement is specified in the user profile 115 to enhance security or enhance efficiency, the profile management service 120 may identify the set of fraud checks to be the full set of fraud checks or a reduced set of fraud checks. In some embodiments, a reduced set of fraud checks may include, e.g., a reduced number of fraud checks performed by the fraud detection service 140, or reduced thresholds or requirements of the fraud checks. Accordingly, the profile management service 120 may instruct the fraud detection service 140 to perform the set of fraud checks for the profile activity authorization request 103.

In some embodiments, depending on the results of the fraud checks returned by the fraud detection service 140 and the open period and/or proximity based on the analytics data 118, the profile management service 120 may generate a fraud determination. In some embodiments the fraud determination may be to authorize, at block 324, or deny, at block 325, the profile activity authorization request 103. In some embodiments, the profile management service 120 may issue the fraud determination as the response 104 to the electronic profile activity execution system 101 as described above.

In some embodiments, the profile management service 120 may also generate a fraud determination graphical user interface (GUI), such as an authorization notification regarding whether the profile activity authorization request 103 is authorized, e.g., in the software application 106, via a communication method (e.g., text message, internet messaging, email, or other communication method). In some embodiments, the fraud determination GUI may include interface elements indicating, e.g., the fraud determine, the profile activity authorization request 103, among other information and combinations thereof.

Figure 4:
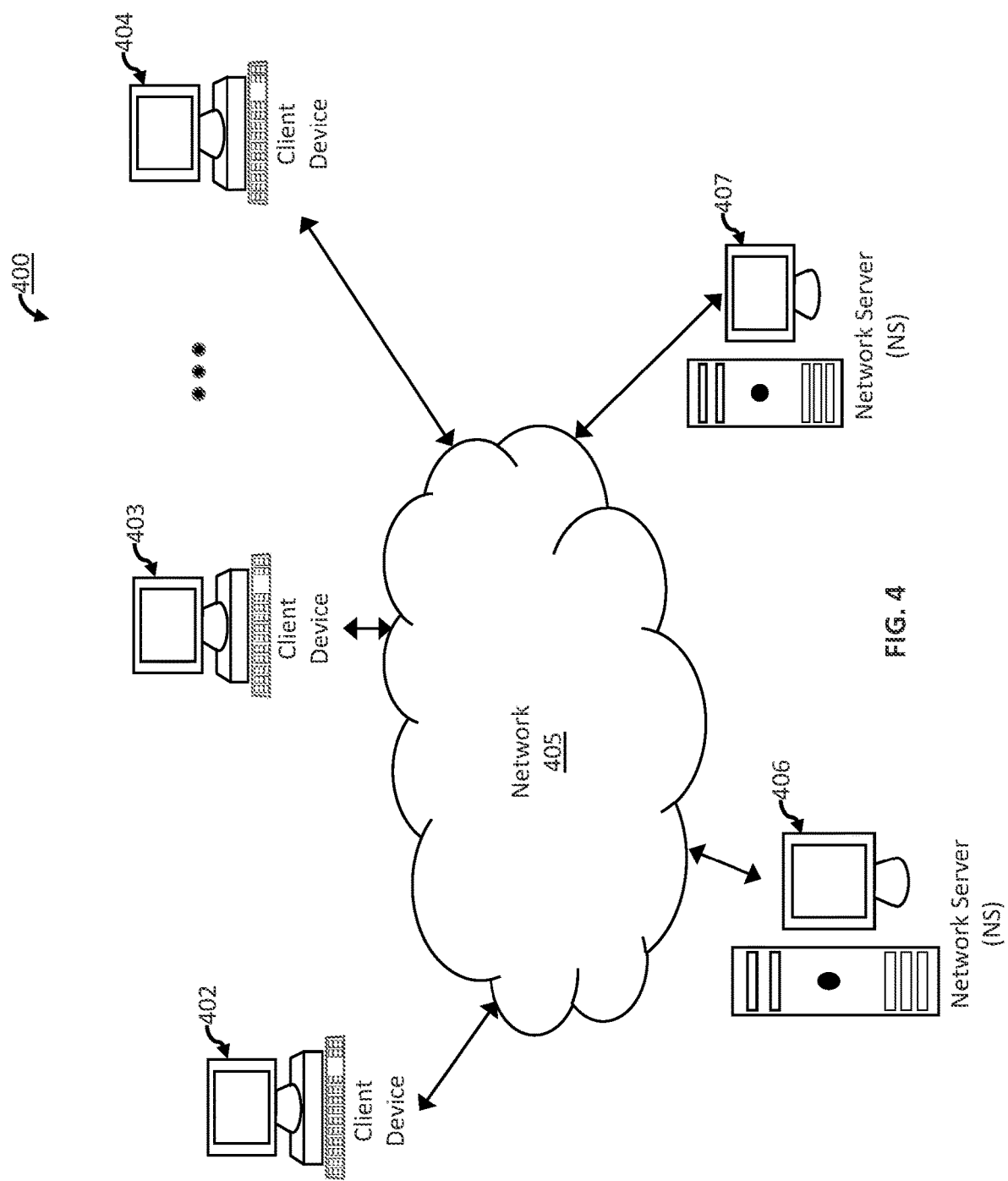

FIG. 4 depicts a block diagram of an exemplary computer-based system and platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 400 may be configured to manage a large number of members and concurrent transactions, as detailed herein. In some embodiments, the exemplary computer-based system and platform 400 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 4, member computing device 402, member computing device 403 through member computing device 404 (e.g., clients) of the exemplary computer-based system and platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authorization servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 5:
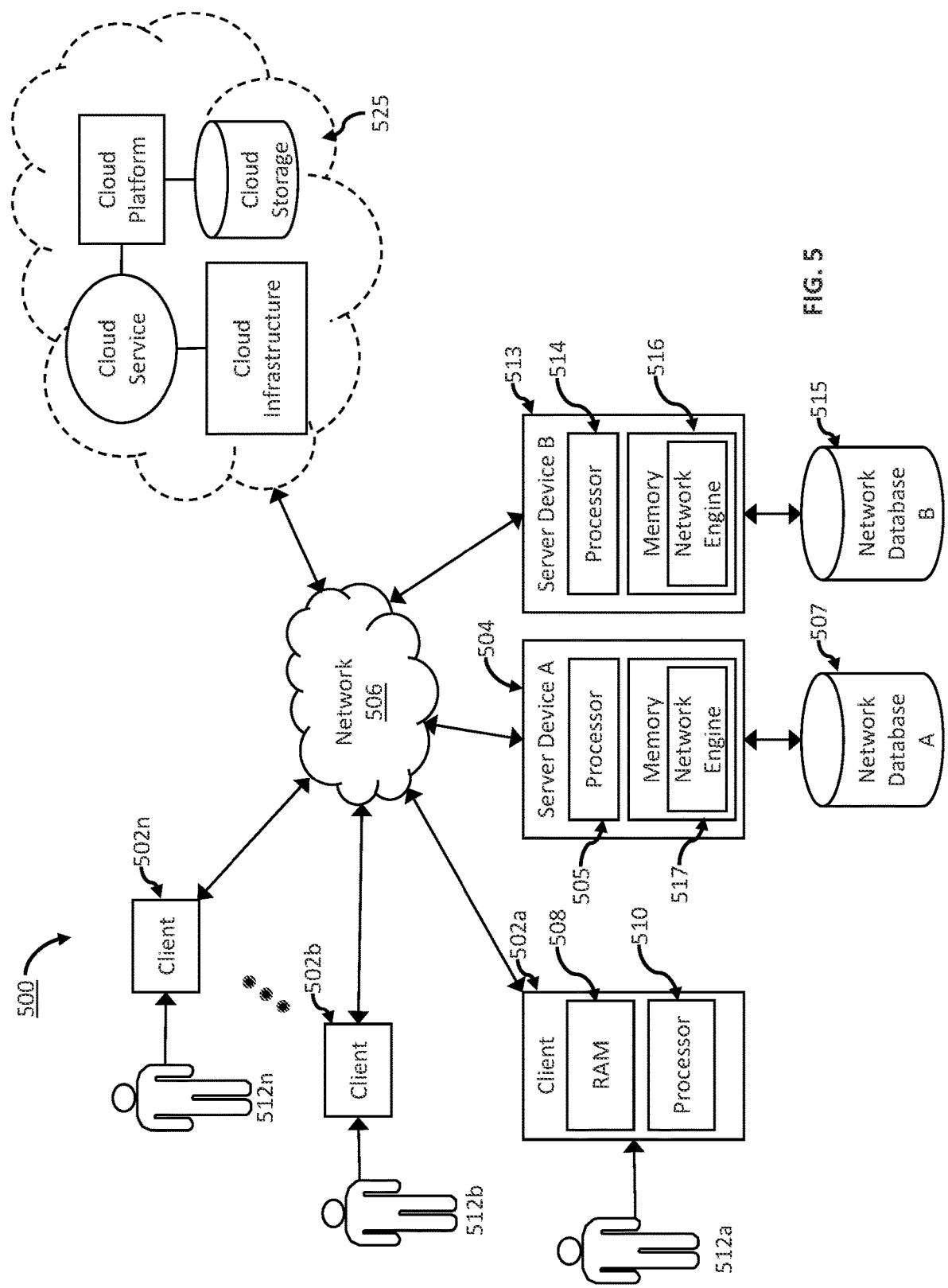
Figure 6:
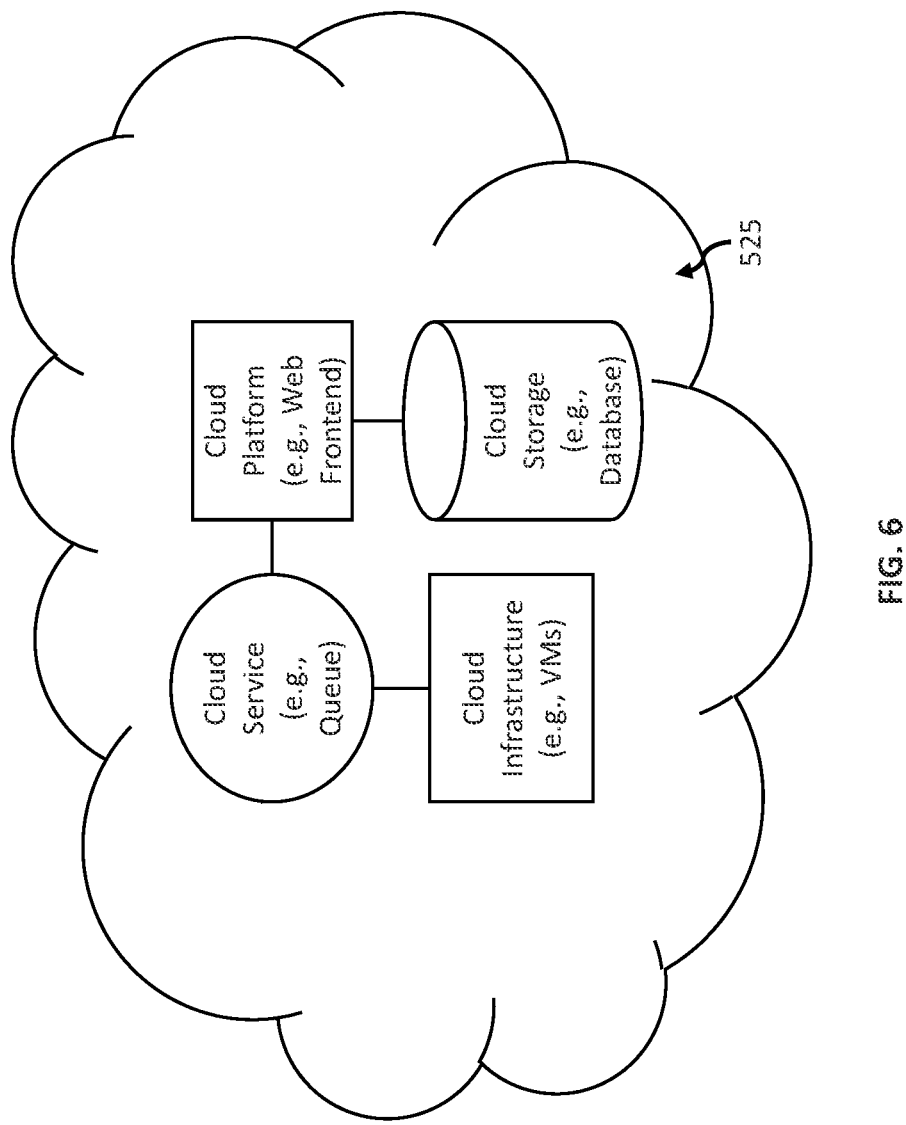
Figure 7:
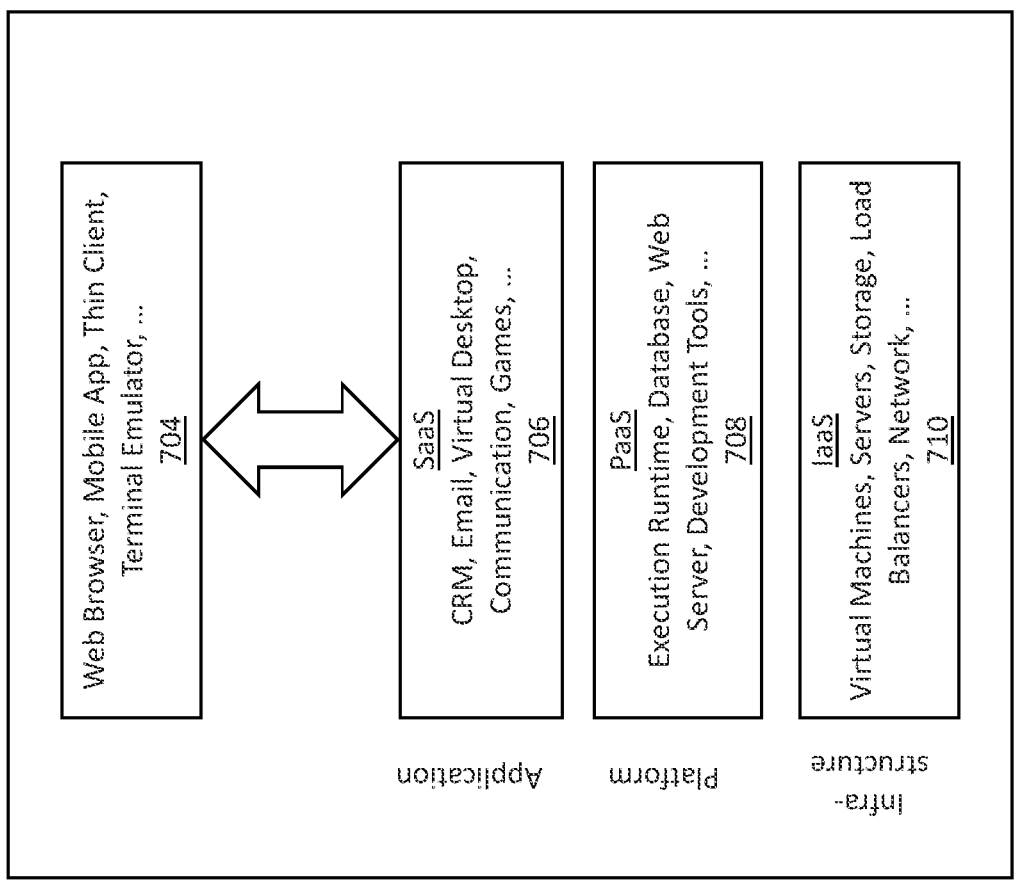

FIG. 5 depicts a block diagram of another exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 502a, member computing device 502b through member computing device 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™, Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, user 512a, user 512b through user 512n, may communicate over the exemplary network 506 with each other and/or with other systems and/or devices coupled to the network 506. As shown in FIG. 5, exemplary server devices 504 and 513 may include processor 505 and processor 514, respectively, as well as memory 517 and memory 516, respectively. In some embodiments, the server devices 504 and 513 may be also coupled to the network 506. In some embodiments, one or more member computing devices 502a through 502n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

In some embodiments, the exemplary inventive computer-based systems/platforms, the exemplary inventive computer-based devices, and/or the exemplary inventive computer-based components of the present disclosure may be specifically configured to operate in a cloud computing/architecture 525 such as, but not limiting to: infrastructure a service (IaaS) 710, platform as a service (PaaS) 708, and/or software as a service (SaaS) 706 using a web browser, mobile app, thin client, terminal emulator or other endpoint 704. FIGS. # and 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate.

In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" May be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms.

In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

1. A method comprising:
   receiving, by at least one processor, an profile activity authorization request associated with a user profile;
   wherein the profile activity authorization request comprises:
     i) a time-stamp associated with an profile activity,
     ii) an profile identifier identifying the user profile associated with the profile activity, and
     iii) a value associated with the profile activity;
   accessing, by the at least one processor, application analytics data for a software application being run on a user device associated with the user profile;
   wherein the application analytics data comprises:
     i) an application open event indicator indicating a time of a loading of the software application on a user device, and
     ii) an application close event indicator indicating a time of a terminating of the software application on the user device;
   determining, by the at least one processor, an open period of the software application on the user device at the time-stamp associated with the profile activity based on the application open event indicator and the application close event indicator;
   selecting, by the at least one processor, a reduced set of fraud checks within a full set of fraud checks when the time-stamp associated with the profile activity is within the open period of the software application;
   executing, by the at least one processor, the reduced set of fraud checks;
   generating, by the at least one processor, a fraud determination based on the execution of the reduced set of fraud checks; and
   generating, by the at least one processor, an authorization notification for the profile activity authorization request based on the fraud determination.

2. A system comprising:
   at least one processor configured to execute software instructions causing the at least one processor to perform steps to:
     receive an profile activity authorization request associated with a user profile;
     wherein the profile activity authorization request comprises:
       i) a time-stamp associated with an profile activity,
       ii) an profile identifier identifying the user profile associated with the profile activity, and
       iii) a value associated with the profile activity;
     access application analytics data for a software application being run on a user device associated with the user profile;
     wherein the application analytics data comprises:
       i) an application open event indicator indicating a loading of the software application on a user device, and
       ii) an application close event indicator indicating a terminating of the software application on the user device;
     determine an open period of the software application on the user device at the time-stamp associated with the profile activity based on the application open event indicator and the application close event indicator;
     select a reduced set of fraud checks within a full set of fraud checks where the time-stamp associated with the profile activity is within the open period of the software application;
     execute the reduced set of fraud checks;
     generate a fraud determination based on the execution of the reduced set of fraud checks; and
     generate an authorization notification for the profile activity authorization request based on the fraud determination.

3. The methods and systems of any one or more of clauses 1 and 2, further comprising determining, by the at least one processor, the full set of fraud checks where the time-stamp associated with the profile activity is not within the open period of the software application.

4. The methods and systems of any one or more of clauses 1 and 2, further comprising:
   determining, by the at least one processor, an absence of the application close event indicator;
   determining, by the at least one processor, a time difference between a current time and the application open event indicator;
   determining, by the at least one processor, an application crash where the time difference exceeds a predetermined time period; and determining, by the at least one processor, the open period to be the predetermined time period for the application crash.

5. The methods and systems of clause 4, further comprising determining, by the at least one processor, the open period to be the time difference where the time difference is less than the predetermined time period.

6. The methods and systems of any one or more of clauses 1 and 2, further comprising:
   accessing, by the at least one processor, a device identifier in the application analytics data for the software application associated with the user profile;
   determining, by the at least one processor, an authorization of the device identifier in the user profile; and
   generating, by the at least one processor, the fraud determination based on the reduced set of fraud checks and the device identifier.

7. The methods and systems of any one or more of clauses 1 and 2, further comprising:
   receiving, by the at least one processor, a location associated with the profile activity authorization request;
   accessing, by the at least one processor, a device location in the application analytics data for the software application associated with the user profile;
   determining, by the at least one processor, a proximity of the user device to the location based on the device location; and
   generating, by the at least one processor, the fraud determination based on the reduced set of fraud checks and the proximity.

8. The method and systems of clause 7, wherein the proximity replaces a subset of fraud checks in the reduced set of fraud checks.

9. The methods and systems of any one or more of clauses 1 and 2, wherein the user profile comprises a profile at a financial institution, and the profile activity authorization request comprises a payment request issued by a point-of-sale terminal at a merchant location.

10. The method and systems of clause 9, wherein the software application comprises a banking application associated with an issuer of a payment card associated with the payment request.

11. The methods and systems of any one or more of clauses 1 and 2, wherein the reduced set of fraud checks comprises reduced fraud thresholds for each fraud check in a full set of fraud checks.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

The invention claimed is:

1. A method comprising:
receiving, by at least one processor, a profile activity authorization request associated with a user profile of the user;
  wherein the profile activity authorization request comprises:
   i) a time-stamp associated with a profile activity,
   ii) a profile identifier identifying the user profile associated with the profile activity, and
   iii) a value associated with the profile activity;
accessing, by the at least one processor, an application log of application events of a software application associated with the user;
  wherein the application events comprise an application open event indicator representing the application open event;
determining, by the at least one processor, based on the application open event indicator, an application open period representing a time period during which the software application is open;
determining, by the at least one processor, the profile activity authorization request is a user intended profile activity authorization request based at least in part on a time difference between the profile activity authorization request and the application open period;
transmitting, by the at least one processor, a signal, in response to the profile activity authorization request, to cause execution of the profile activity based at least in part on the profile activity authorization request is the user intended profile activity authorization request.

2. The method as recited in claim 1, wherein the application open event indicator comprises a time of a user selection.

3. The method as recited in claim 1, wherein the application open event comprises a user selection to open a software application installed on a user computing device associated with the user.

4. The method of claim 1, further comprising determining, by the at least one processor, a full set of fraud checks where the time-stamp associated with the profile activity is not within the open period of the software application.

5. The method of claim 1, further comprising:
accessing, by the at least one processor, a device identifier associated with the application open event indicator for the software application associated with the user profile;
determining, by the at least one processor, an authorization of the device identifier in the user profile; and
generating, by the at least one processor, a fraud determination based on a reduced set of fraud checks and the device identifier.

6. The method of claim 1, further comprising:
receiving, by the at least one processor, a location associated with the profile activity authorization request;
accessing, by the at least one processor, a device location associated with the application open event indicator for the software application associated with the user profile;
determining, by the at least one processor, a proximity of the user device to the location based on the device location; and
generating, by the at least one processor, a fraud determination based on a reduced set of fraud checks and the proximity.

7. The method of claim 6, wherein the proximity replaces a subset of fraud checks in the reduced set of fraud checks.

8. The method of claim 1, wherein the user profile comprises a profile at a financial institution, and the profile activity authorization request comprises a payment request issued by a point-of-sale terminal at a merchant location.

9. The method of claim 8, wherein the software application comprises a banking application associated with an issuer of a payment card associated with the payment request.

10. The method of claim 1, wherein a reduced set of fraud checks comprises reduced fraud thresholds for each fraud check in a full set of fraud checks.

11. A system comprising:
at least one processor configured to execute software instructions causing the at least one processor to perform steps to:
  receive a profile activity authorization request associated with a user profile of the user;
   wherein the profile activity authorization request comprises:
    i) a time-stamp associated with a profile activity,
    ii) a profile identifier identifying the user profile associated with the profile activity, and
    iii) a value associated with the profile activity;
  access an application log of application events of a software application associated with the user;
   wherein the application events comprise an application open event indicator representing the application open event;
  determine, based on the application open event indicator, an application open period representing a time period during which the software application is open;
  determine the profile activity authorization request is a user intended profile activity authorization request based at least in part on a time difference between the profile activity authorization request and the application open period;
  transmit a signal, in response to the profile activity authorization request, to cause execution of the profile activity based at least in part on the profile activity authorization request is the user intended profile activity authorization request.

12. The system as recited in claim 11, wherein the application open event indicator comprises a time of a user selection.

13. The system as recited in claim 11, wherein the application open event comprises a user selection to open a software application installed on a user computing device associated with the user.

14. The system of claim 11, wherein the software instructions further cause the at least one processor to perform steps to determine a full set of fraud checks where the time-stamp associated with the profile activity is not within the open period of the software application.

15. The system of claim 11, wherein the software instructions further cause the at least one processor to perform steps to:
 access a device identifier associated with the application open event indicator for the software application associated with the user profile;
 determine an authorization of the device identifier in the user profile; and
 generate a fraud determination based on a reduced set of fraud checks and the device identifier.

16. The system of claim 11, wherein the software instructions further cause the at least one processor to perform steps to:
 receive a location associated with the profile activity authorization request;
 access a device location associated with the application open event indicator for the software application associated with the user profile;
 determine a proximity of the user device to the location based on the device location; and
 generate a fraud determination based on a reduced set of fraud checks and the proximity.

17. The system of claim 16, wherein the proximity replaces a subset of fraud checks in the reduced set of fraud checks.

18. The system of claim 11, wherein the user profile comprises a profile at a financial institution, and the profile activity authorization request comprises a payment request issued by a point-of-sale terminal at a merchant location.

19. The system of claim 18, wherein the software application comprises a banking application associated with an issuer of a payment card associated with the payment request.

20. The system of claim 11, wherein a reduced set of fraud checks comprises reduced fraud thresholds for each fraud check in a full set of fraud checks.

\* \* \* \* \*